US009021950B2

(12) United States Patent
Izawa et al.

(10) Patent No.: US 9,021,950 B2
(45) Date of Patent: May 5, 2015

(54) PRINTER CYLINDER ASSEMBLY FOR A PRINTING MACHINE

(71) Applicants: Hideo Izawa, Narashino (JP); Reishi Fujiwara, Daisen (JP); Kazuhiko Satou, Daisen (JP); Kazumi Odashima, Daisden (JP)

(72) Inventors: Hideo Izawa, Narashino (JP); Reishi Fujiwara, Daisen (JP); Kazuhiko Satou, Daisen (JP); Kazumi Odashima, Daisden (JP)

(73) Assignee: Miyakoshi Printing Machinery Co., Ltd., Chiba (JP)

( * ) Notice: Subject to any disclaimer, the term of this patent is extended or adjusted under 35 U.S.C. 154(b) by 74 days.

(21) Appl. No.: 14/060,278

(22) Filed: Oct. 22, 2013

(65) Prior Publication Data

US 2014/0123864 A1 May 8, 2014

(30) Foreign Application Priority Data

Nov. 6, 2012 (JP) ................................. 2012-244359

(51) Int. Cl.
*B41F 27/14* (2006.01)
*B41F 3/20* (2006.01)
(Continued)

(52) U.S. Cl.
CPC . *B41F 3/20* (2013.01); *B41F 30/04* (2013.01); *B41F 13/10* (2013.01);
(Continued)

(58) Field of Classification Search
CPC .............. B41N 1/00; B41N 6/00; B41N 7/00; B41F 27/005; B41F 27/14; B41F 27/1293; B41F 27/12; B41P 2213/802; B41P 2217/15; B41P 2227/21
See application file for complete search history.

(56) References Cited

U.S. PATENT DOCUMENTS 5,451,010 A * 9/1995 Heuser ........................ 242/530.3
5,771,807 A * 6/1998 Moss ............................ 101/375
(Continued)

FOREIGN PATENT DOCUMENTS

DE   103 31 943 A1   2/2005
EP    0 369 498 A2   5/1990
(Continued)

OTHER PUBLICATIONS

Extended European Search Report dated Feb. 10, 2014, issued in corresponding European Application No. 13190111.8.

*Primary Examiner* — David Banh
(74) *Attorney, Agent, or Firm* — Westerman, Hattori, Daniels & Adrian, LLP

(57) ABSTRACT

A printing cylinder assembly for a printing machine having a sleeve cylinder which can be simply coupled to and decoupled from a rotating shaft and which can be exchanged easily. The sleeve cylinder is mounted to fit on the rotating shaft so that it can be fitted on, and be extracted from, the rotating shaft, constituting a printing cylinder. The rotating shaft is provided with a cam shaft and a coupling member that constitutes a coupling mechanism. In a coupling and a decoupling state which the coupling mechanism comes into, rotations of the cam shaft cause the coupling member to couple and decouple the sleeve cylinder to and from the rotating shaft when the coupling member is diametrically urged against, and parted from, the inner diametric surface of the sleeve cylinder, respectively.

15 Claims, 10 Drawing Sheets

(51) Int. Cl.
*B41F 30/04* (2006.01)
*B41F 13/10* (2006.01)
*B41F 13/193* (2006.01)
*B41F 13/21* (2006.01)
*B41F 27/10* (2006.01)
*B41F 27/12* (2006.01)
*B65H 75/24* (2006.01)
*F16D 13/16* (2006.01)
*F16C 13/00* (2006.01)

(52) U.S. Cl.
CPC ............. *B41F 13/193* (2013.01); *B41F 13/21* (2013.01); *B41F 27/105* (2013.01); *B41F 27/1231* (2013.01); *B41F 27/14* (2013.01); *F16D 13/16* (2013.01); *F16C 13/00* (2013.01); *B41P 2213/25* (2013.01); *B41P 2213/802* (2013.01); *B41P 2217/15* (2013.01); *B41P 2227/21* (2013.01); *B65H 75/246* (2013.01)

(56) References Cited

U.S. PATENT DOCUMENTS

| | | | |
|---|---|---|---|
| 6,647,879 B1 * | 11/2003 | Papadopoulos et al. | 101/376 |
| 7,007,886 B2 * | 3/2006 | Oesterwind et al. | 242/573.7 |
| 2003/0177925 A1* | 9/2003 | Lorig et al. | 101/375 |
| 2006/0196987 A1* | 9/2006 | Offerhaus | 242/572 |
| 2008/0173196 A1* | 7/2008 | Iwamoto et al. | 101/375 |
| 2009/0044713 A1* | 2/2009 | Fuhrmann et al. | 101/375 |
| 2009/0211475 A1* | 8/2009 | Taylor | 101/375 |
| 2010/0043658 A1 | 2/2010 | Zlatin et al. | |

FOREIGN PATENT DOCUMENTS

| | | |
|---|---|---|
| JP | 2004-074526 A | 3/2004 |
| WO | 2011/019816 A1 | 2/2011 |

\* cited by examiner

PRINTER CYLINDER ASSEMBLY FOR A PRINTING MACHINE

BACKGROUND OF THE INVENTION

1. Technical Field

The present invention relates to a printing cylinder assembly for a printing machine in which a printing cylinder whose diameter is changeable is used to produce printed images that are different in their top-bottom length.

2. Background Art

A printing machine designed to print on a continuous sheet or web of paper, print images which are different in top-bottom length has been disclosed in JP 2004-74526 A.

Such printing machines are known as a sleeve cylinder exchangeable variable printer, in which a printing cylinder comprises a sleeve cylinder removably mounted to fit on the rotating shaft so that it can be fitted on, and be extracted from, the rotating shaft. Sleeve cylinders of different diameters are prepared for printing images of different top-bottom lengths and a sleeve cylinder is selected which is of a particular diameter that meet a particular top-bottom length of an image to be printed. Each of such sleeve cylinders is mounted on the rotating shaft to print on a continuous web of paper print images different in top-bottom length.

To enable a sleeve cylinder to be exchanged in the conventional printing cylinder assembly described above in which the sleeve cylinder is removably mounted to fit on the rotating shaft so that it can be fitted on and be extracted from the rotating shaft, it is necessary to couple the sleeve cylinder and the rotating shaft together so that the sleeve cylinder may not move axially or rotate around the rotating shaft but may be rotated integrally with the rotating shaft, and by releasing the coupling to decouple the sleeve cylinder from the rotating shaft so that the sleeve cylinder can be extracted from and be fitted on the rotating shaft.

Moreover, in order for the sleeve cylinders to be exchanged in a short period of operating time, it is desirable that coupling and decoupling of a sleeve cylinder and a rotating shaft as mentioned above be simply accomplished.

In view of problems as mentioned above, it is an object of the present invention to provide a printing cylinder assembly in which a sleeve cylinder can removably be mounted to fit on a rotating shaft so that it can be fitted on and be extracted from the rotating shaft and in which coupling and decoupling of the sleeve cylinder and the rotating shaft can simply be accomplished.

DISCLOSURE OF THE INVENTION

The present invention provides a printing cylinder assembly for a printing machine, characterized in that the assembly includes a rotating shaft, a sleeve cylinder removably mounted to fit on the rotating shaft so that it can be fitted on, and be extracted from, the rotating shaft, and a coupling mechanism for coupling and decoupling the sleeve cylinder to and from the rotating shaft, the coupling mechanism comprising a cam shaft and a coupling member with which the rotating shaft is provided, and bringing about a coupling state that the coupling member moved diametrically of the rotating shaft is urged into fastening frictional contact with an inner diameter portion of the sleeve cylinder, thereby coupling the sleeve cylinder and the rotating shaft together, and a decoupling state that the coupling member is parted from the inner diameter portion of the sleeve cylinder, thereby decoupling the sleeve cylinder from the rotating shaft, by rotation of the cam shaft.

In a printing cylinder assembly for a printing machine as mentioned above, the invention may specifically be implemented in that the cam shaft has a cam portion formed circumferentially with a planar and a circular arc surface, the coupling member comprises a movable pin held opposite to the cam portion, a pressure block held opposite to the inner diameter portion of the sleeve cylinder and a pressure elastic element interposed between the movable pin and the pressure block, whereby the movable pin when contacted with the cam portion's circular arc surface by a rotation of the cam shaft is moved to compress the pressure elastic element and to provide an increased elastic force, the increased elastic force driving the pressure block into such contact with the inner diameter portion of the sleeve cylinder and thereby establishing the coupling state, and the movable pin when contacted with the cam portion's planar surface by a rotation of the cam shaft decompresses the pressure elastic element to restore its original state, the restored original state bringing the pressure block away from the inner diameter portion of the sleeve cylinder and thereby establishing the decoupling state.

As the present invention is so implemented as mentioned above, a rotation of the cam shaft to bring the circular arc surface in contact with the movable pin can drive the pressure block in an intense force into contact with the inner diameter portion of the sleeve cylinder to couple the sleeve cylinder and the rotating shaft together. And, another rotation of the cam shaft to bring the planar surface in contact with the movable pin can decouple the sleeve cylinder and the rotating shaft from each other. Moreover, since an increase in the elastic force of the pressure elastic element is used to drive the pressure block into contact with the inner diametric portion of the sleeve cylinder, with a dimensional error if any in a part it is ensured that the sleeve cylinder and the rotating shaft can be coupled together.

In a printing cylinder assembly for a printing machine as mentioned above, the invention may further specifically be implemented in that the pressure block is movable diametrically of the rotating shaft and is provided with a return elastic element for biasing the pressure block with a biasing elastic force towards a center of the rotating shaft, whereby the movable pin when contacted with the cam portion's circular arc surface is moved to compress the pressure elastic element and to provide an increased elastic force greater than the biasing elastic force sufficient to drive the pressure block into contact with the inner diameter portion of the sleeve cylinder, thereby establishing the coupling state, and the movable pin when contacted with the cam portion's planar surface allows the pressure elastic element to be decompressed to restore its original elastic force and the pressure block to be moved by the biasing elastic force of the return elastic element towards the center of the rotating shaft, thereby establishing the decoupling state.

As the invention is so implement as mentioned, it is ensured that rotations of the cam shaft bring about a coupling and decoupling state.

In a printing cylinder assembly for a printing machine as mentioned above, the invention may also specifically be implemented in that the sleeve cylinder comprises a cylinder body made of an aluminum alloy, and a first and a second bearer made of steel and which are attached to one and the other axial ends of the cylinder body, respectively, and the coupling mechanism comprises a first and a second coupling member which contact with inner peripheral surfaces of the first and second bearers, respectively.

This implementation of the invention makes the sleeve cylinder light-weighted, facilitating its exchanging operation. Further, the sleeve cylinder and the rotating shaft can be coupled at an increased strength.

In a printing cylinder assembly for a printing machine as mentioned above, the invention may also specifically be implemented in that the rotating shaft is axially supported at one axial end thereof in a cantilever structure so that it may not develop an axial deflection or thrust load, the cam shaft has a protrusion projecting from the other end of the rotating shaft, the protrusion having an operating finger knob, the sleeve cylinder is formed axially and inner-peripherally with a plurality of annular disk shaped ribs and made by casting of an aluminum alloy, the plural ribs forming the inner diameter portion for fitting on the axis of rotation, whereby the sleeve cylinder so formed can be fitted on, and be extracted from, the rotating shaft, from the other axial end thereof.

As the invention is so implemented, the sleeve cylinder can be light-weighted and is allowed simply to be fitted on, and to be extracted from, the rotating shaft by manual operation through the other axial end of the rotating shaft. Further, rotating the cam shaft by simply turning the operating knob manually at the other axial end of the rotating shaft facilitates the sleeve cylinder exchanging operation.

In a printing cylinder assembly for a printing machine as mentioned above, the invention may also specifically be implemented in that the coupling mechanism includes three such coupling members positioned at an interval of angle 120 degrees circumferentially of the rotating shaft, the three coupling members being adapted to contact with the inner diameter portion of the sleeve cylinder at three circumferentially equidistant positions, respectively.

As the invention is so implemented, coupling the sleeve cylinder and the rotating shaft at three circumferential positions can couple them at an increased firmness.

In a printing cylinder assembly for a printing machine as mentioned above, the invention may also specifically be implemented in that the sleeve cylinder is composed of an aluminum alloy, comprising a cylinder and a plurality of annular disk shaped ribs formed on and axially of an inner peripheral surface of the cylinder, the ribs forming an inner diameter portion for fitting on the rotating shaft, the cylinder having on an inner peripheral surface thereof a first convex area for groove machining and a dynamically balancing, second convex area positioned diametrically opposite to the first convex area, the cylinder being machined at a region of the first convex area to form a groove therein for insertion of a grip leading and a grip trailing end of an insertable printing plate, the sleeve cylinder thereby constituting a plate cylinder.

This implementation of the invention makes the plate insertion groove greater in depth than in the thickness of the cylinder of the sleeve cylinder (the thickness of the sleeve cylinder) so as to firmly receive and support the grip leading and training ends of an insertable printing plate.

Moreover, it is made possible to keep rotation balance of the sleeve cylinder and to increase its rate of rotation and hence to print at higher speed.

According to the present invention, rotations of the cam shaft can simply couple and decouple between the sleeve cylinder and the rotating shaft, making it possible to perform the sleeve cylinder exchanging operation in a shortened period of time.

BEST MODES FOR CARRYING OUT THE INVENTION

Figure 1:
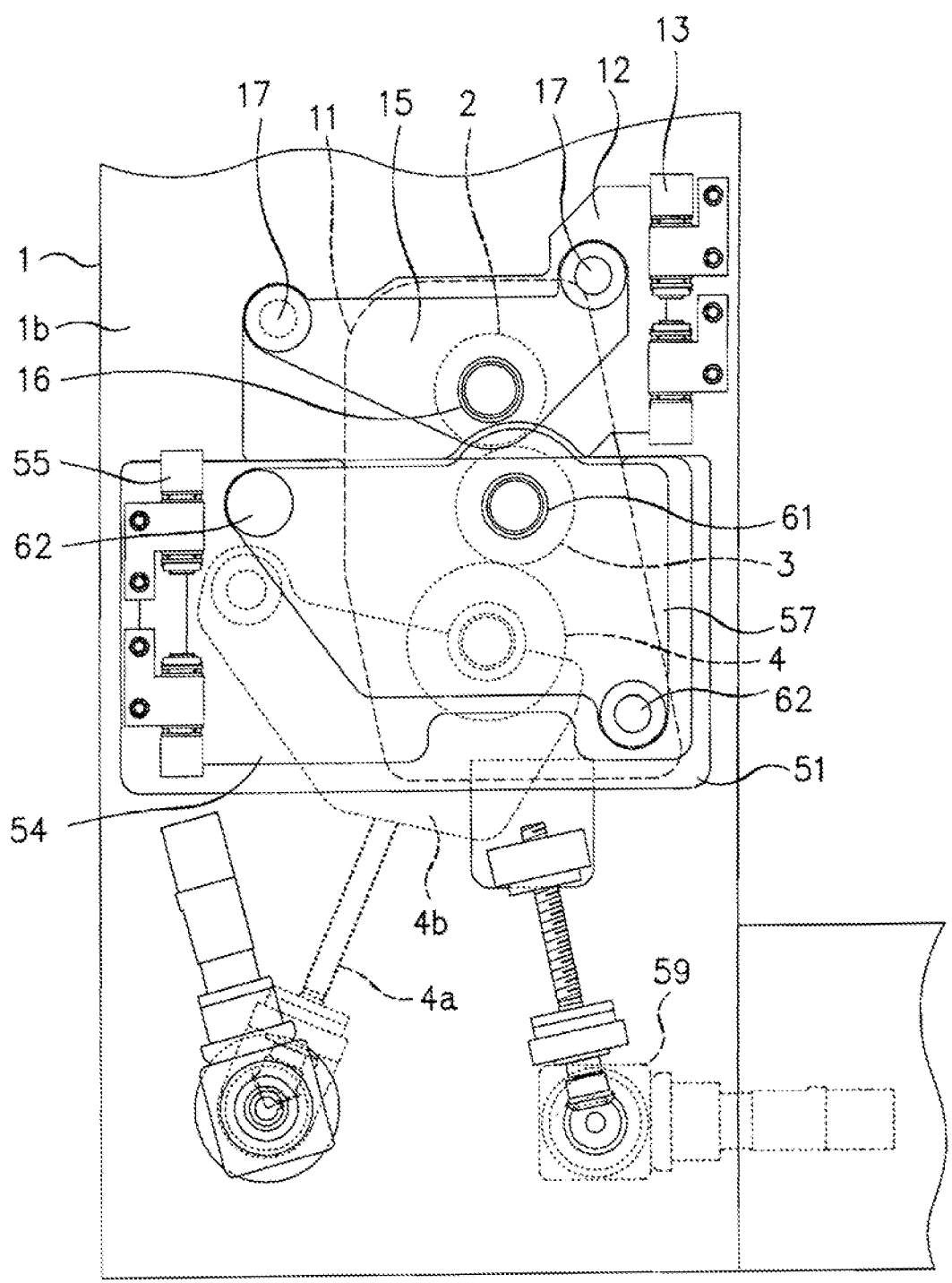
FIG. 1 is a front view of a printing machine.

As shown in FIG. 1, a machine main frame 1 has a plate cylinder 2, a blanket cylinder 3 and an impression cylinder 4 rotatably mounted thereto, respectively, the plate and blanket cylinders 2 and 3 each constituting a printing cylinder.

Figure 2:
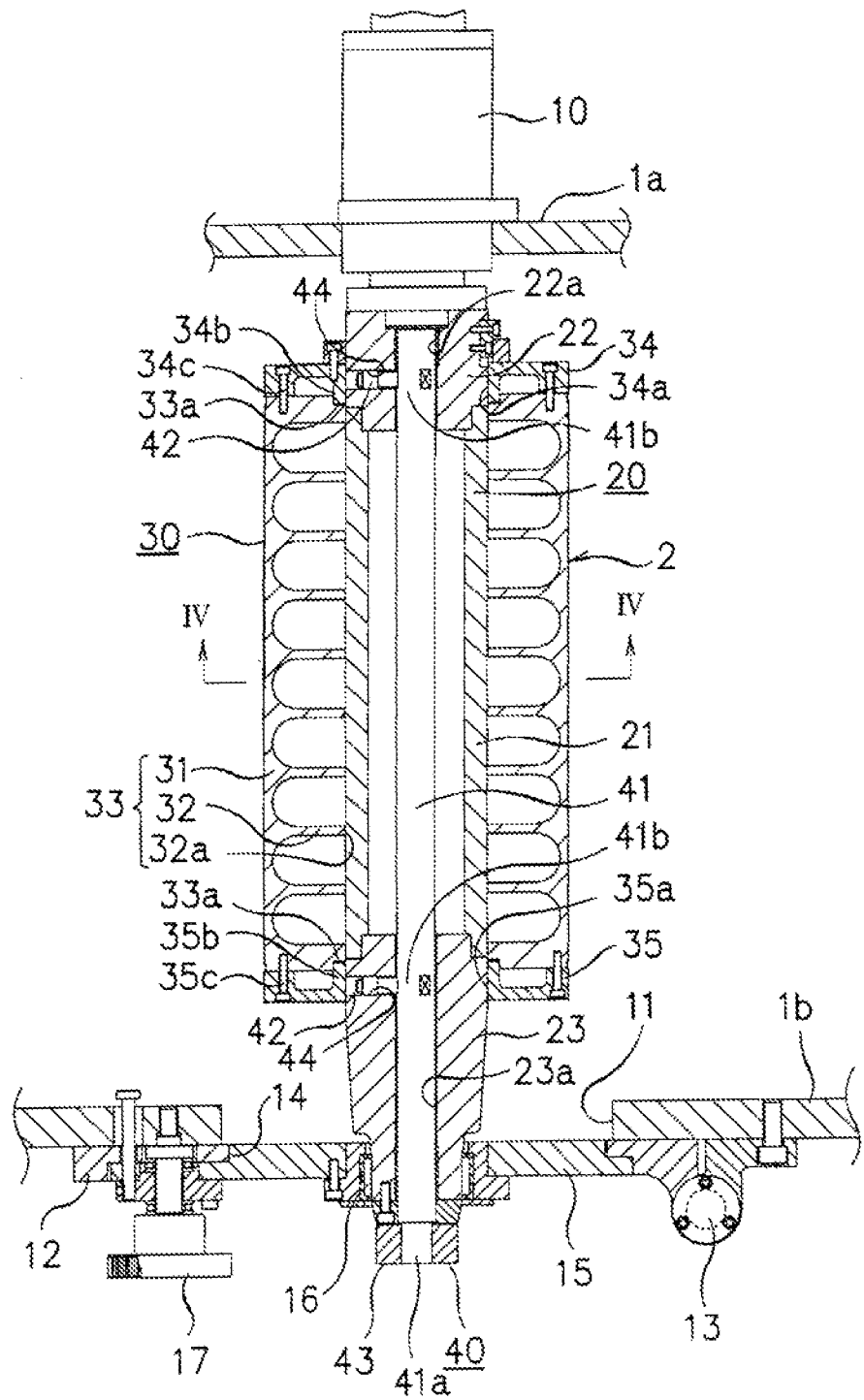
FIG. 2 is a transverse sectional view of a structure in which a plate cylinder of FIG. 1 is mounted.
Figure 3:
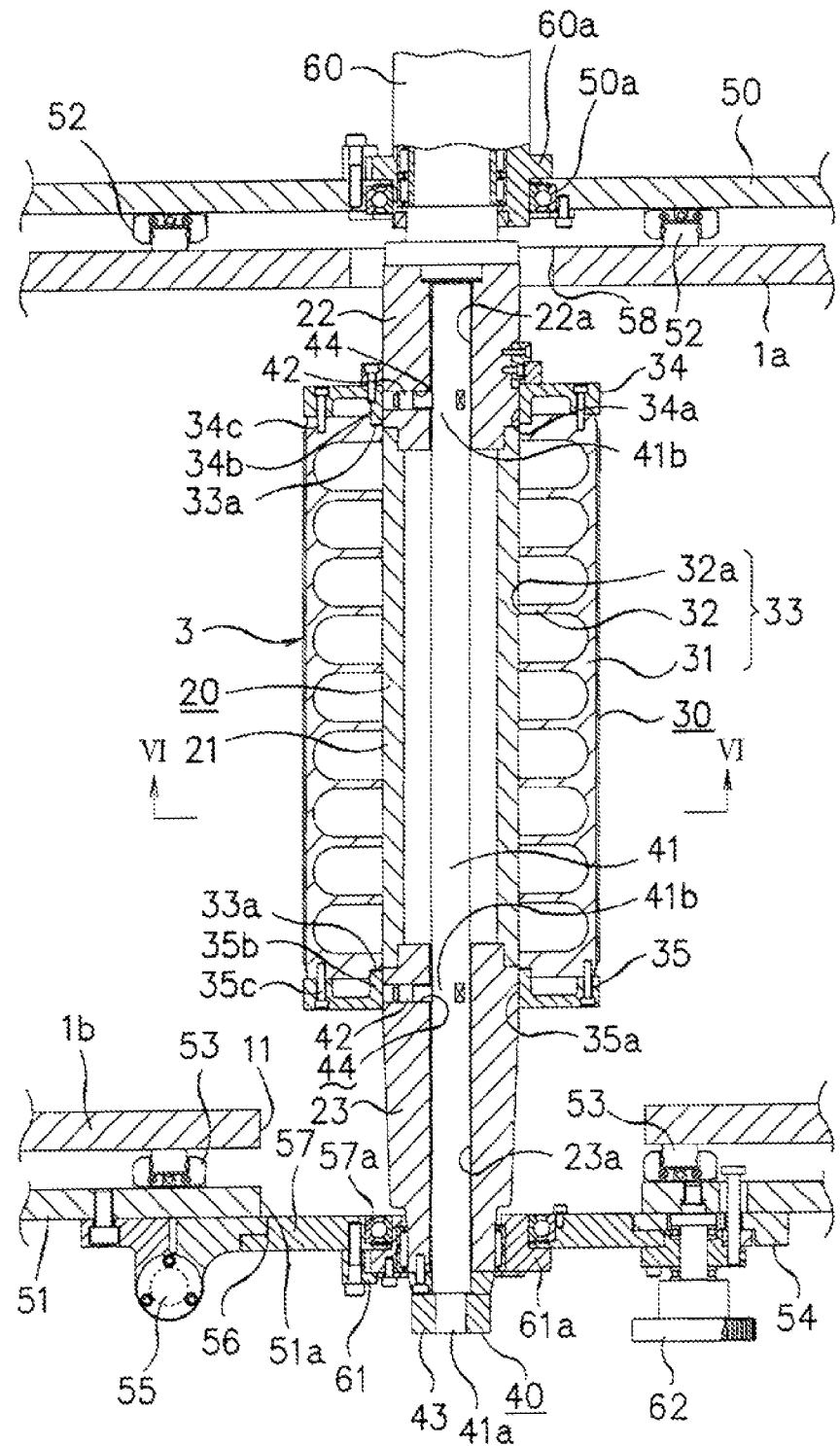
FIG. 3 is a transverse sectional view of a structure in which a blanket cylinder of FIG. 1 is mounted.

As shown in FIGS. 1, 2 and 3, the machine main frame 1 has one side and the other side main frame member 1a and 1b which are at one and the other axial sides of the cylinders, respectively.

As shown in FIG. 2, the plate cylinder 2 in a printing cylinder assembly has a rotating shaft 20, and a sleeve cylinder 30 removably mounted to fit on the rotating shaft 20 so that the sleeve cylinder 30 can be fitted on, and be extracted from, the rotating shaft 20.

The rotating shaft 20 and the sleeve cylinder 30 are coupled together so that they may not be rotated and axially moved relatively each other, and are decoupled from each other so that they may rotate and axially move relatively each other, by means of a coupling mechanism 40.

The rotating shaft 20 and the sleeve cylinder 30 are provided in the cylinder assembly with a key and a key groove (not shown), respectively, and are made integral in structure for rotation with the key fitted in the key groove.

As shown in FIG. 3, in the printing cylinder assembly the blanket cylinder 3 as with the plate cylinder 2 is provided with a sleeve cylinder 30 which is removably mounted to fit on a rotating shaft 20 so that the sleeve cylinder can be fitted on, and can be extracted from, the rotating shaft 20.

The rotating shaft 20 and the sleeve cylinder 30 are made capable of being coupled to and decoupled from each other by the coupling mechanism 40 mentioned above.

The rotating shaft 20 and the sleeve cylinder 30 are made integral in structure for rotation with a key and a key groove (not shown) fitted with each other as also mentioned above.

The rotating shaft 20 in the plate cylinder 2 and the rotating shaft 20 in the blanket cylinder 3 are likewise shaped. The rotating shaft 20 for the plate cylinder 2 is mounted as shown in FIG. 2 and the rotating shaft 20 for the blanket cylinder 3 is mounted as shown in FIG. 3. And, the rotating shaft 20 for the blanket cylinder 3 is made longer than the rotating shaft 20 for the plate cylinder 2.

The sleeve cylinder 30 for the plate cylinder 2 and the sleeve cylinder 30 for the blanket cylinder 3 are likewise shaped and identical in length.

A structure for mounting the rotating shaft 20 for the plate cylinder 2 is described with reference to FIG. 2.

One axial end of the rotating shaft 20 is rotatably pivotally supported in a cantilever structure by one end bearing member 10 mounted on the one side main frame member 1a. And, one sleeve cylinder 30 is exchanged with another sleeve cylinder of a different diameter from the side of the other side main frame member 1b to change the diameter of the plate cylinder 2.

The other side main frame member 1b is formed with an opening 11 for insertion and extraction of the plate cylinder 2, the blanket cylinder 3. And, the other side main frame member 1b has a plate cylinder turning frame member 12 mounted thereto as being capable of turning horizontally by a hinge 13.

The plate cylinder turning frame member 12 is adapted to turn over between a first position at which it lies in contact with an outer surface of the other side main frame member 1b and faces the other axial end of the plate cylinder 2 and a second position at which it lies out of contact with the outer surface of the other side main frame member 1b and away from the other axial end of the plate cylinder 2 to allow the sleeve cylinder 30 to be pulled out through the opening 11.

The plate cylinder turning frame member 12 has a hole 14 through which a portion of the rotating shaft 20 close to its other axial end may be passed. And, there is mounted a plate cylinder housing member 15 fitted into this hole 14.

By means of the other end bearing member 16 with which the plate cylinder housing 15 is provided, the other axial end of the rotating shaft 20 is supported rotatably and so as to be capable of being axially inserted and extracted.

And, operating move units 17 moves the plate cylinder housing member 15 towards and away from the plate cylinder turning frame member 12. When the plate cylinder turning frame member 12 lies at the first position, the plate cylinder housing member 15 is moved axially of the plate cylinder 2 over between a position at which the other end bearing member 16 takes a support position to support the other axial end of the rotating shaft 20 and a position at which the member 16 takes a release position to release the support, while maintaining its parallelism in position to the turning frame member 12.

The move units 17 as shown in FIG. 1 are positioned at right and left or both sides of the plate cylinder housing member 15. The rotating shaft 20 of the plate cylinder 2 is supported intermediate between the right and left sides of the plate cylinder housing member 15. Operating the right and left move units 17 translates the plate cylinder housing member 15 axially of the rotating shaft 20.

This allows the other end bearing member 16 to be extracted from the other axial end of the rotating shaft 20 by moving the plate cylinder housing member 15, and the plate cylinder turning frame member 12 to turn, thus to open the opening 11.

And, the rotating shaft 20 is axially supported in a cantilever structure on the one side main frame member 1a in the state that an axial deflection or thrust load may not develop, and it is made possible for a sleeve cylinder 30 to be fitted on, and to be extracted from, the rotating shaft 20 through the opening 11 of the other side main frame member 1b.

Thus, one sleeve cylinder 30 can be exchanged by another sleeve cylinder 30 of a different diameter.

Mention is made next of a structure for mounting a rotating shaft 20 in the blanket cylinder 3.

As shown in FIG. 3, the one side and other side main frame members 1a and 1b are provided outside thereof with one side and the other side auxiliary frame member 50 and 51, respectively, each of which is movable towards and away from the blanket cylinder 3.

For example, on the outer side surface of the one side main frame member 1a there is provided a right and left pair of one side linear guides 52 and 52 which make the one side auxiliary frame member 50 movable towards and away from the blanket cylinder 3.

On the outer side surface of the other side main frame member 1b there is provided a right and left pair of other side linear guides 53 and 53 which make the other side auxiliary frame member 51 movable towards and away from the blanket cylinder 3.

The other side auxiliary frame member 51 has a blanket cylinder turning frame member 54 mounted thereto as being capable of turning horizontally by a hinge 55.

The blanket cylinder turning frame member 54 is adapted to turn over between a first position at which it closes an opening 51a of the other side auxiliary frame member 51 and faces the other axial end of the blanket cylinder 3 and a second position at which it opens the opening 51a to allow the sleeve cylinder 30 to be extracted through the opening 51a. The opening 51a is opposite to the opening 11 of the other side main frame member 1b to allow the blanket cylinder 3 to be passed through them.

The blanket cylinder turning frame member 54 has a hole 56 into which a blanket cylinder housing member 57 is fitted.

The one axial end of the rotating shaft 20 is passed through a hole 58 in the one side main frame member 1a and is rotatably pivotally supported in a cantilever structure by one end bearing member 60 with which the one side auxiliary frame member 50 is provided.

The other axial end of the rotating shaft 20 projects axially outwards from the opening 11 of the other side main frame member 1b and the opening 51a of the other side auxiliary main frame member 51. By means of the other end bearing member 61 with which the blanket cylinder housing member 57 is provided, the other axial end of the rotating shaft 20 is supported rotatably and so as to be capable of being inserted and extracted axially.

And, by operating move units 62, the blanket cylinder housing member 57 as with the plate cylinder housing member 15 is moved towards and away from the blanket cylinder turning frame member 54. When the blanket cylinder turning frame member 54 lies at the first position, the blanket cylinder housing member 57 is translated axially of the blanket cylinder 3 over between a position at which the other end bearing member 61 takes a support position and a position at which it takes a release position.

The other end bearing member 61 when at the support position is fitted with the other axial end of the rotating shaft 20 to support it rotatably and when at the release position is pulled out of it to release its support.

This allows the other end bearing member 61 to be extracted from the other axial end of the rotating shaft 20 by moving the blanket cylinder housing member 57, and the blanket cylinder turning frame member 54 to turn to the second position, thus to open the opening 51a.

And, the rotating shaft 20 is pivotally supported in a cantilever structure on the one side auxiliary frame member 50 in the state that an axial deflection or thrust load may not develop, and it is made possible for a sleeve cylinder 30 to be fitted on, and to be extracted from, the rotating shaft 20 through the opening 11 of the other side main frame member 1*b*.

Thus, one sleeve cylinder 30 can be exchanged by another sleeve cylinder 30 of a different diameter.

As can be seen from FIG. 1, driving a move mechanism 59 moves the one side and other side auxiliary frame members 50 and 51. As the blanket cylinder 3 is moved towards and away from the plate cylinder 2, the distance between the center of the plate cylinder 2 and the center of the blanket cylinder 3 is varied.

Thus, in printing print images different in top-bottom length as mentioned above by exchanging a sleeve cylinder 30 of the plate cylinder 2 and a sleeve cylinder 30 of the blanket cylinder 3 with sleeve cylinders different in diameter to change the peripheral lengths of the plate and blanket cylinders 2 and 3, the distance between the center of the plate cylinder 2 and the center of the blanket cylinder 3 is varied so as to ensure that the plate and blanket cylinders 2 and 3 are made in contact properly with each other.

The one end and other end bearing members 60 and 61 of the one side and other side auxiliary frame members 50 and 51 for rotatably supporting both the axial ends of the rotating shaft of the blanket cylinder 3 are each of an eccentric bearing such that they can move the blanket cylinder 3 away from the plate and impression cylinders 2 and 4.

For example, a bearing box of the other end bearing member 61 has an inner peripheral surface eccentric to its outer peripheral surface and is mounted rotatably in a hole 57*a* of the blanket cylinder housing member 57. Then, rotating the bearing box 57*a* by a rotating means (not shown) displaces the rotating shaft 20, thereby moving the blanket cylinder 3 towards and away from the plate and impression cylinders 2 and 4.

Likewise, of the one end bearing member 60, a bearing box 60*a* having an inner peripheral surface eccentric to its outer peripheral surface is rotatably supported in a hole 50*a* of the one side auxiliary frame member 50.

The rotating means for the bearing boxes 60*a* and 61*a* may be of, though not limited to, a structure having arms fastened to the bearing boxes 60*a* and 61*a* and a link connected to the arms and swung by a cylinder or an electric motor whereby swinging the link causes the bearing boxed 60 and 61*a* to rotate.

Moving the blanket cylinder 3 away from the plate and impression cylinders 2 and 4 as mentioned above facilitates operation of exchanging the plate of the plate cylinder 2 and also operation of paper passing.

The impression cylinder 4 as shown in FIG. 1 is attached to an arm 4*b* swung by a swinging mechanism 4*a*.

Figure 4:
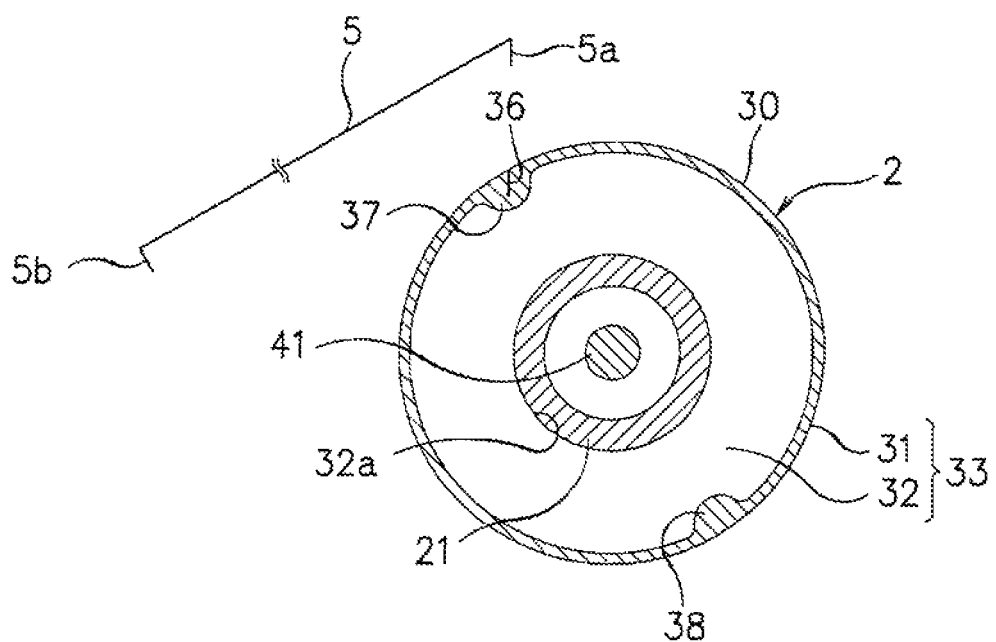
FIG. 4 is a cross-sectional view of the plate cylinder shown in FIG. 2, taken along the line IV-IV therein.

Mention is next made of details of the plate cylinder 2 with reference to FIGS. 2, 4 and 5.

The rotating shaft 20 comprises an intermediate cylindrical section 21, a hollow one side shaft section 22 mounted fitted in one axial end of the intermediate cylindrical section 21 and a hollow other side shaft section 23 mounted fitted in the other axial end of the intermediate cylindrical section 21, the intermediate section of the rotating shaft in its axial direction being hollow.

The other side shaft section 23 is tapered towards the other axial end so that the sleeve cylinder 30 easily fits thereon.

The sleeve cylinder 30 has a cylinder body 33, one side bearer 34 and the other side bearer 35. The cylinder body 33 has a plurality of ribs 32 formed axially spaced apart on an inner peripheral surface of a cylinder 31, each of the ribs 32 being in the form of a disk having a central circular opening 32*a*. The circular opening 32*a* of the ribs 32 are fitted on an outer peripheral surface of the rotating shaft 20. The one side bearer 34 is attached to the one axial end of the cylinder body 33 and the other side bearer 35 is attached to the other axial end of the cylinder body 33.

The one side and the other side bearers 34 and 35 are each cylindrical in shape and their inner peripheral surfaces 34*a* and 35*a* have a diameter equal to that of the circular opening 32*a* of the ribs 32, thereby forming an inner diameter (peripheral) portion as fitted with the outer peripheral surface of the rotating shaft 20.

The cylinder body 33 is formed by casting on an aluminum alloy and has its outer periphery consisting of the outer peripheral surface of the cylinder body 31 and its inner periphery consisting of the circular opening 32*a* of the ribs 32, which peripheries are mechanically finished.

In other words, the cylinder body 33 is formed into a hollow shape and provided axially with a number of the annular disk-shaped ribs 32 which has an inner diameter portion for fitting on the rotating shaft 20. The sleeve cylinder body is formed by casting with an aluminum alloy and has its outer and inner peripheries mechanically finished.

The one side and other side bearers 34 and 35 are each made of steel and are provided inner-peripherally with annular projections 34*b* and 35*b* for fitting on annular recesses 33*a* and 33*a* formed at its both end faces of the cylinder body 33, and have bolts 34*c* and 35*c* threaded into the cylinder body 33 whereby the pads are attached to the cylinder body 33.

The sleeve cylinder 30 which as mentioned above is essentially hollow, of a configuration having a plurality of the ribs 32 inner-peripherally and made of aluminum can make the plate cylinder 2 light-weighted and hence facilitates manual operation of mounting and dismounting the sleeve cylinder 30 by causing it to be fitted on and to be extracted from the rotating shaft 20 and operation of its exchange.

Note that the sleeve cylinder 30 may be constituted of the cylinder body 33 without using the one side and other side bearers 34 and 35.

As shown in FIG. 4, the sleeve cylinder 30 (cylinder body 33) is formed outer-peripherally with a plate insertion groove 36 which extends axially and into which a grip leading end 5*a* and a grip trailing end 5*b* of an insertable printing plate 5 may be inserted.

Figure 5A:
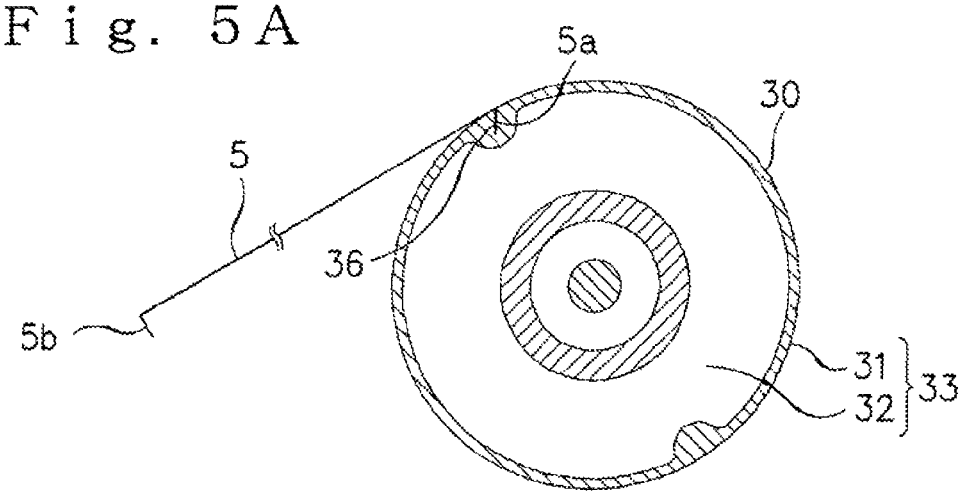
FIGS. 5A-5C are cross-sectional, explanatory views illustrating an operation of mounting an insertable printing plate.
Figure 5B:
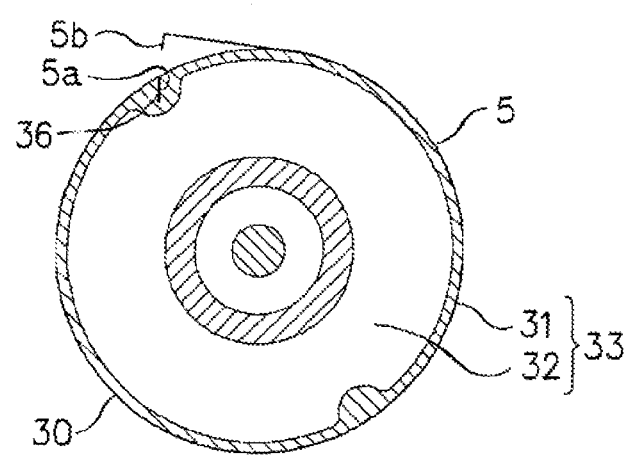
Figure 5C:
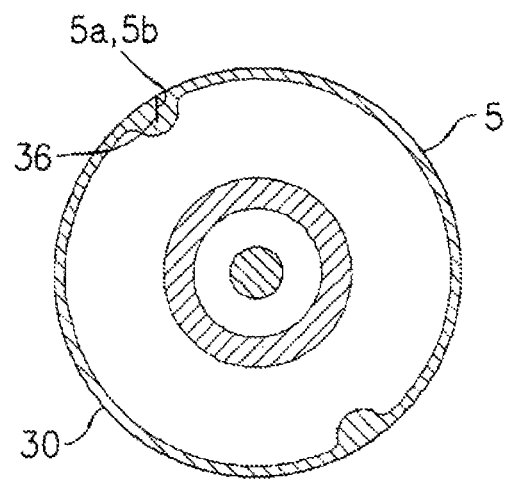

And, the grip leading end 5*a* of the insertable printing plate 5 is inserted into the plate insertion groove 36 as shown in FIG. 5A so that the printing plate 5 is wound onto the outer peripheral surface of the sleeve cylinder 30 as shown in FIG. 5B. And, as shown in FIG. 5C the grip trailing end 5*b* of the insertable printing plate 5 is inserted into the plate insertion groove 36 to attach the insertable printing plate 5 onto the outer peripheral surface of the sleeve cylinder 30.

The plate insertion groove 36 needs to be of a depth sufficient to accept the grip leading end 5*a* and the grip trailing end 5*b* of the insertable printing plate 5. As mentioned above, however, the sleeve cylinder 30 (cylinder 31) is made thin because of its light-weighting requirement. The inner peripheral surface of the sleeve cylinder 30 (cylinder 31) is then formed with an axially continuous convex area 37 for groove machining, which area is formed by machining with the plate insertion groove 36 that can be of a sufficient depth even though the sleeve cylinder 30 is made thin in wall thickness. In other words, the depth of the plate insertion groove 5 is made larger than the wall thickness of the sleeve cylinder 30 (cylinder 31).

A deterioration of balance in rotation of the sleeve cylinder 30 by forming the convex area 37 for machining on a portion of its inner cylindrical surface is avoided by forming a dynamically balancing convex area 38 as shown at a position diametrically opposite to the convex area 37 for machining on the inner cylindrical surface of the sleeve cylinder 30. Thus, the sleeve cylinder 30 being dynamically balanced in rotation can be stably rotated.

This allows the plate cylinder 22 to be rotated rapidly, permitting high-speed printing.

Figure 6:
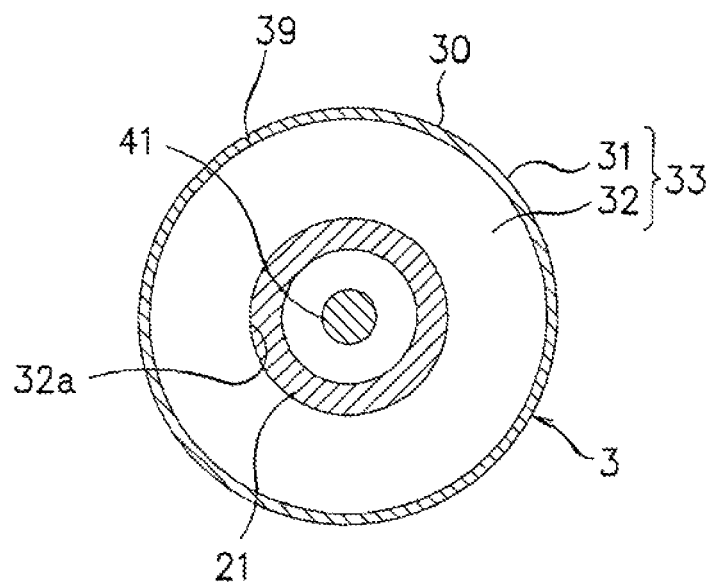
FIG. 6 is a cross-sectional view of the blanket cylinder shown in FIG. 3, taken along the line VI-VI therein.

Mention is next made of details of the blanket cylinder 3 with reference to FIGS. 3, 6 and 7.

The rotating shaft 20 for the blanket cylinder 3 as with the rotating shaft 20 for the plate cylinder 2 is constituted of an intermediate cylindrical section 21, one side shaft section 22 and the other side shaft section 23 as shown in FIGS. 3 and 6.

And, the intermediate cylindrical section 21 is equal in length to the intermediate cylindrical section 21 of the rotating shaft 20 for the plate cylinder 2 and the one and other shaft sections 22 and 23 here are longer in length than the one and other shaft sections 22 and 23 of the rotating shaft 20 for the plate cylinder 2, making their entire length longer than that of the rotating shaft 20 for the plate cylinder 2.

A sleeve cylinder 30 for the blanket cylinder 3 as with the sleeve cylinder 30 for the plate cylinder 2 is constituted of a cylinder body 33 made of an aluminum alloy and comprising a cylinder 31 and a plurality of annular disk-shaped ribs 32, and is provided with one side and the other side bearer 34 and 35 made of steel, in which circular openings 32a of the ribs 32 and inner peripheral surfaces of the one side and other side bearers 34 and 35 form an inner diameter (or inner peripheral) portion fitted on the outer peripheral surface of the rotating shaft 20.

The one side and other side bearers 34 and 35 as with those for the plate cylinder 2 have annular projections 34b and 35b for fitting in annular recesses 33a and 33a and bolts 34c and 35c used to fasten the pads to the cylinder body 33.

Thus, the sleeve cylinder 30 for the blanket cylinder 3 as with the sleeve cylinder 30 for the plate cylinder 30 can easily be caused to be fitted on and be extracted from the rotating shaft 20 in manual operation, hence facilitating its exchanging operation.

The sleeve cylinder 30 (cylinder body 33) for the blanket cylinder 3 as shown in FIG. 6 is formed outer-peripherally with a blanket cutting V-groove 39 which continuously extends axially.

Figure 7A:
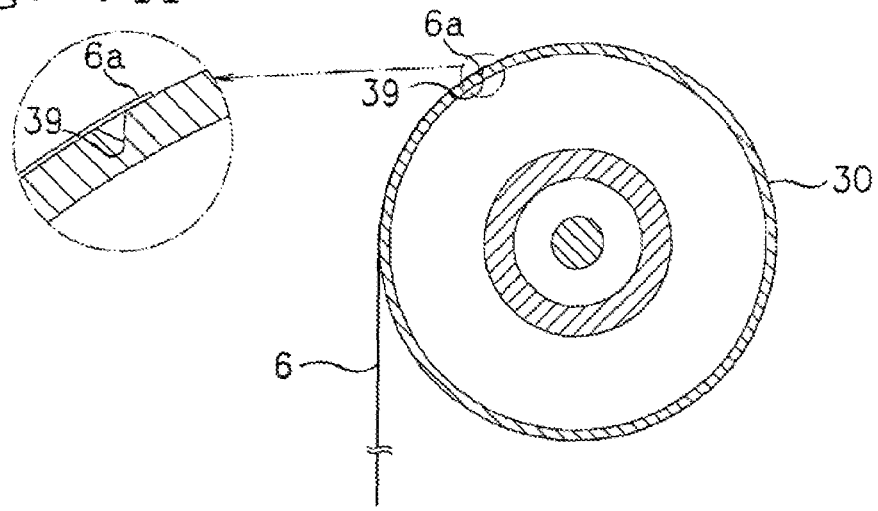
FIGS. 7A-7C are explanatory cross-sectional views illustrating an operation of sticking a blanket with pressure sensitive adhesive.
Figure 7B:
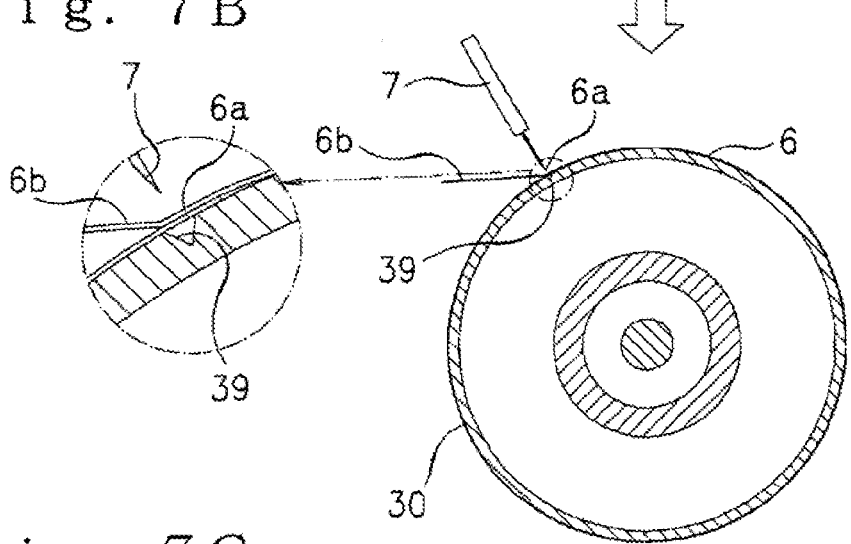

And, a leading edge 6a of a blanket 6 with pressure sensitive adhesive as shown in FIG. 7A is stuck on the sleeve cylinder 30 along the V-groove 39. And, from the V-groove 39 the blanket 6 with pressure sensitive adhesive is wound around and stuck to the outer peripheral surface of the sleeve cylinder 30. As shown in FIG. 7B, a trailing edge 6b of the blanket 6 wound around and stuck to the sleeve cylinder 30 passes over and beyond the V-groove 39 and is stuck to the leading edge 6a.

Figure 7C:
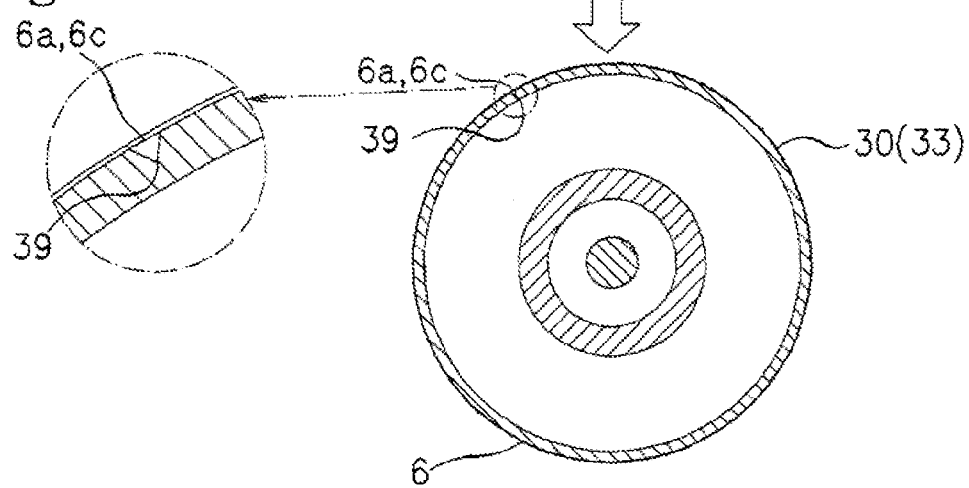

In this state, a cutter edge 7 is moved axially of the cylinder 30 along the cutting V-groove 39 to cut along the V-groove 39 the blanket 6 where its edge portions (6a and 6b) overlap, giving rise, as shown in FIG. 7C, to the state that the blanket 6 with adhesive has been stuck on the outer peripheral surface of the sleeve cylinder 30.

This makes it possible for a blanket 6 with pressure sensitive adhesive to be stuck around the outer peripheral surface of the sleeve cylinder 30 so that its leading edge 6a and any cut edge 6c may not overlap.

Moreover, since the cutter edge 7 can only be moved along the blanket cutting V-groove 39, its operation is quite simple.

Mention is next made of the coupling mechanism 40 in the printing cylinder assembly.

As shown in FIGS. 2 and 3, the rotating shaft 20 is provided in the printing cylinder assembly with a cam shaft 41, and a coupling member 42 which as the cam portion 41 is rotated, is moved diametrically of the rotating shaft 20.

The cam shaft 41 is rotated at a given angle over between a coupling and a decoupling position.

The cam shaft 41 when rotated to the coupling position acts to cause the coupling member 42 to move towards the outer peripheral surface of the rotating shaft 20, to protrude from the outer peripheral surface of the rotating shaft 20 and to be driven into intensive contact with the inner diameter portion of the sleeve cylinder 30, causing the sleeve cylinder 30 to be coupled by frictional fastening to the rotating shaft 20 so that the sleeve cylinder 30 may not be moved rotationally or axially with respect to the rotating shaft 20.

The cam shaft 41 when rotated to the decoupling position is deactivated so that the coupling member 42 may not be moved towards the outer peripheral surface of the rotating shaft 20, may not protrude from the outer peripheral surface of the rotating shaft 20 and may not be brought into intensive contact with the inner diameter portion of the sleeve cylinder 30, causing the sleeve cylinder 30 to be decoupled without frictional fastening to the rotating shaft 20 so that the sleeve cylinder 30 may be moved both rotationally or axially with respect to the rotating shaft 20.

Rotating the cam shaft 41 to the coupling and decoupling positions to cause the sleeve cylinder 30 to be coupled to and decoupled from the rotating shaft 20 in this way allows the sleeve cylinder 30 to be coupled to and decoupled from the rotating shaft 20 simply and hence makes it possible to accomplish an exchanging operation for the sleeve cylinder 30 in a short period of time.

The cam shaft 41 passing axially through the intermediate cylindrical section 21 of the rotating shaft 20 is rotatably fitted in the bore 22a formed around an axial center of the one side shaft section 22 and in the bore 23a formed around an axial center of the other side shaft section 23, protruding from the other side shaft section 23 to the other side to be a protruding end 41a which has an operating finger nut 43 attached thereto.

The cam shaft 41 which is rotatably supported in the bores 22a and 23a at both axial end portions thereof can simply be rotated with the operating finger nut 43, ensuring that the coupling member 42 can be moved towards the outer peripheral surface of the rotating shaft 20.

The one side and other side shaft sections 22 and 24 of the rotating shaft 20 are formed with mounting holes 44 and 44, respectively, each of which opens the bore 22a, 23a diametrically to the outer peripheral surface and is provided with the coupling member 42 such as to be movable diametrically.

The cam shaft 41 is formed close to both axial end portions thereof with cam portions 41b and 41b each of which is held in contact with each coupling member 42.

The one coupling member 42 is held in contact with the inner peripheral surface 34a of the one side bearer 34 and the other coupling member 42 is held in contact with the inner peripheral surface 35a of the other side bearer 35.

Since the coupling member 42, 42 in this way is driven into contact with each of portions close to both axial ends of the inner diameter area of the sleeve cylinder 30 and is coupled by frictional fastening thereto at each of two axial positions, the sleeve cylinder 30 can be coupled securely to the rotating shaft 20.

Moreover, since the coupling member 42, 42 is driven or urged into contact with the inner peripheral surface 34a, 35a of the one side and other side bearers 34 and 35 and the frictional fastening is thus made greater in strength, the sleeve cylinder 30 can be coupled to the rotating shaft 20 more securely.

Figure 8:
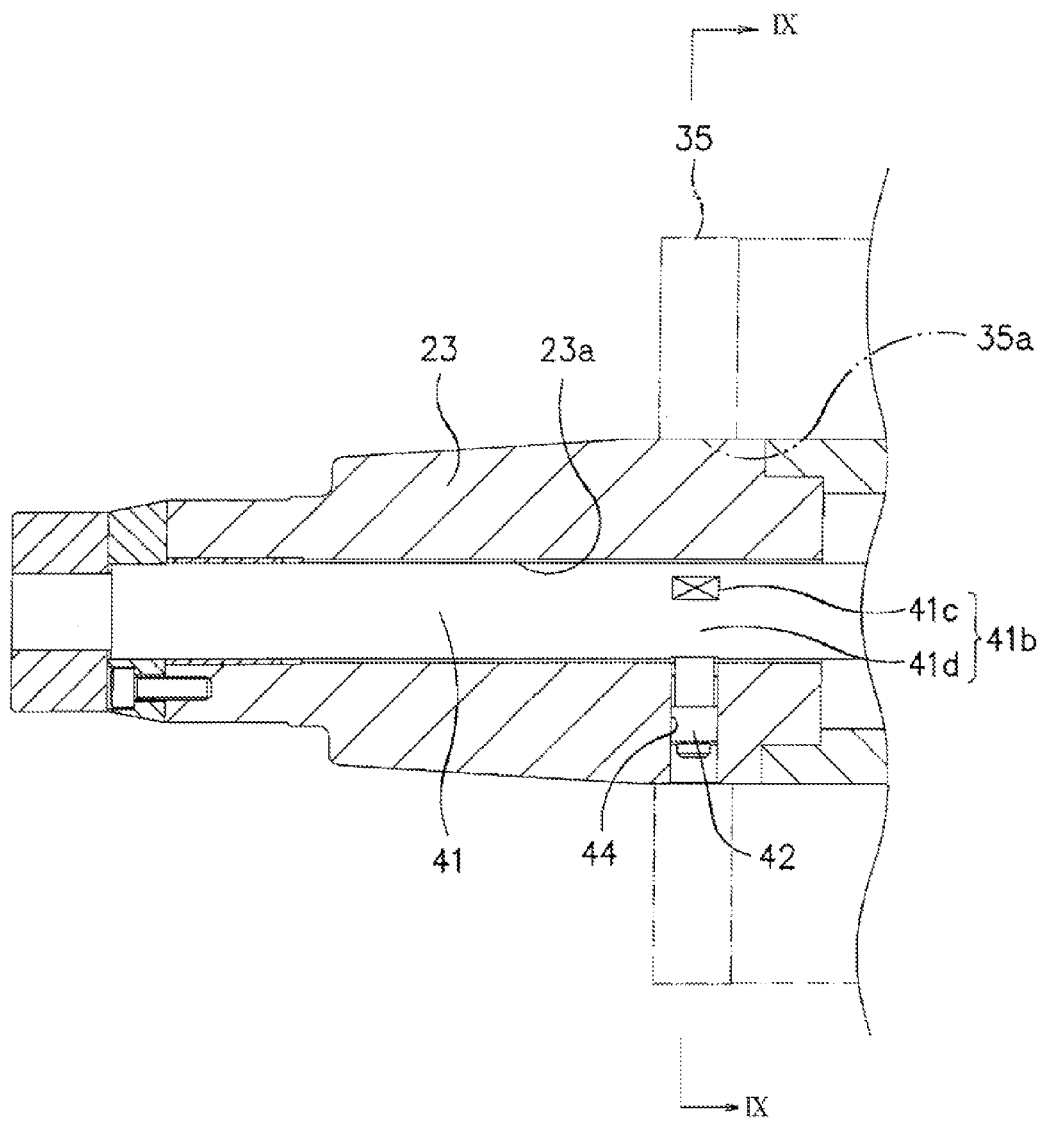
FIG. 8 is a sectional view in part enlarged of a rotating shaft.
Figure 9:
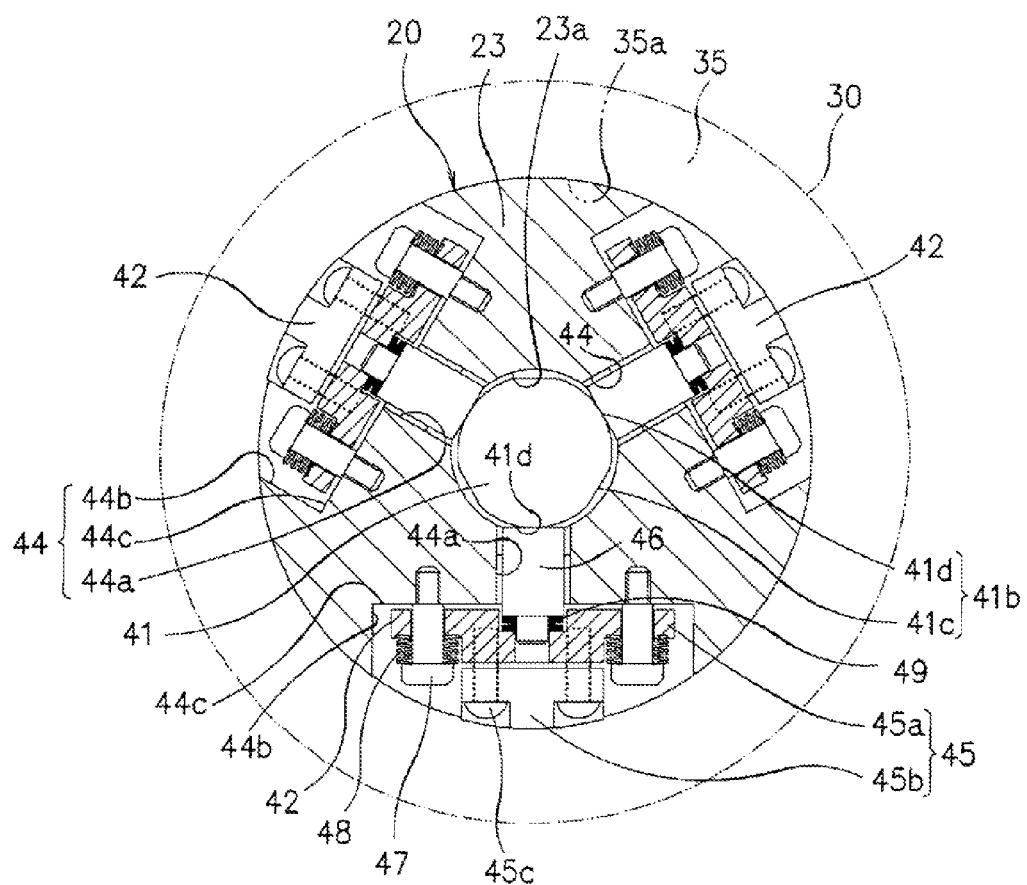
FIG. 9 is an enlarged cross-sectional view of the rotating shaft shown in FIG. 8, taken along the line IX-IX therein, illustrating the rotating shaft and a sleeve cylinder in the state that they are coupled together.
Figure 10:
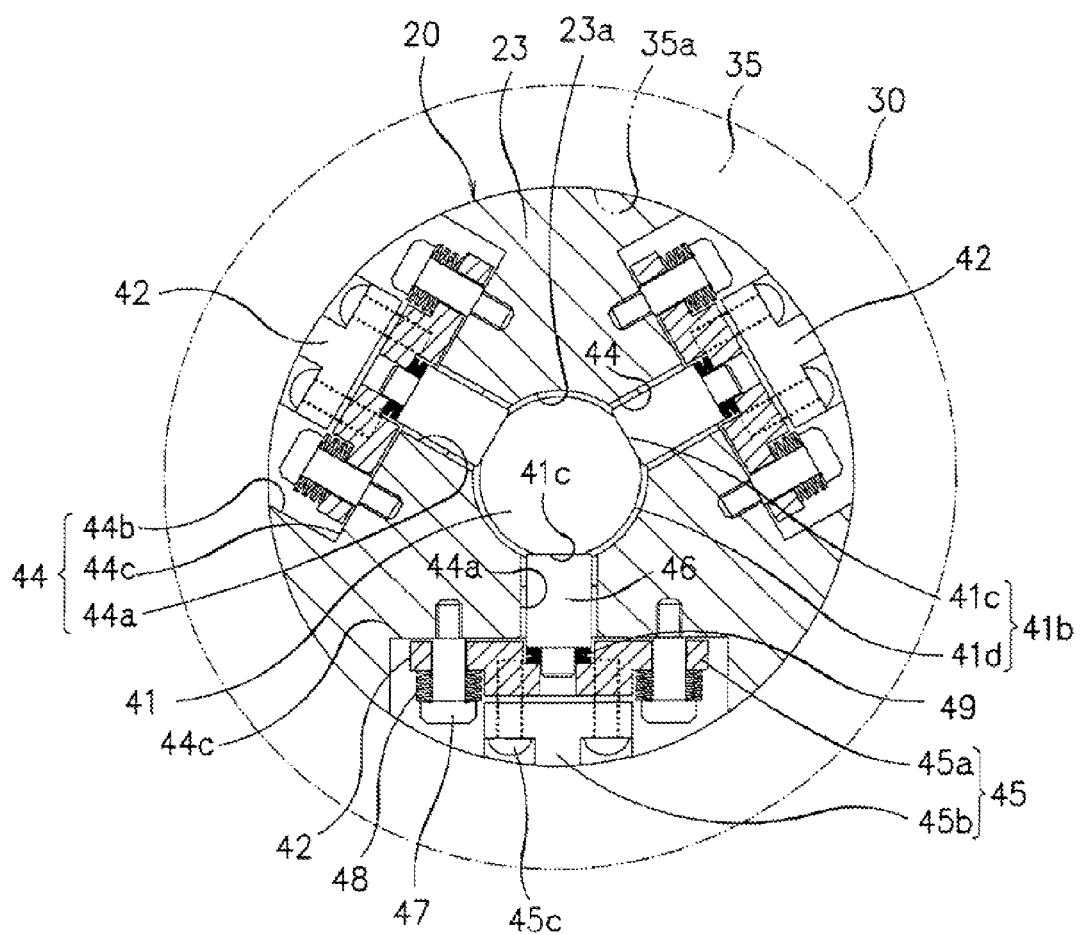
FIG. 10 is a similar cross-sectional view illustrating the rotating shaft and a sleeve cylinder in the state that they are decoupled from each other.

Mention is next made of the cam portion 41b of the cam shaft 41 and the coupling member 42 with reference to FIGS. 8 to 10.

On the cam shaft 41 which is circular in cross section, a circumferential portion of its outer peripheral surface is machined so as to be planar to provide a cam portion 41b of a configuration having a planar surface 41c and a circular arc surface 41d circumferentially.

In this form of implementation of the invention, it has three planar surfaces 41c positioned at an interval of angle 120 degrees and three circular arc surfaces 41d one of which is interposed between two adjacent planar surfaces 41c.

The mounting hole 44 as shown in FIG. 9 has an inner peripheral side hole section 44a that is open to the bore 23a of the other side shaft section 23 and an outer peripheral side hole section 44b that is continuous with the inner peripheral side hole section 44a and open to the outer peripheral surface of the other side shaft section 23. The inner peripheral side hole section 44a is circular in shape, and the outer peripheral side hole section 44b is rectangular in shape, having a side larger than a diameter of the inner peripheral side hole section 44a. The mounting hole 44 as a whole is of a stepped shape with a step 44c.

Three such mounting holes 44 are radially provided at an interval of angle 120 degrees.

Three coupling members 42 are provided radially in the three mounting holes 44, respectively.

Each coupling member 42 comprises a pressure block 45 provided in the outer peripheral side hole section 44b and a movable pin 46 inserted so as to be able to slide in the inner peripheral side hole section 44a.

The pressure block 45 is provided movably along guide pins 47 diametrically of the rotating shaft 20. The pressure block 45 is urged to move by a return elastic element, e.g. return disc spring 48, towards the center of the rotating shaft 20 (hereinafter referred to as "towards the inner peripheral side"). The pressure block 45 comprises a movable block 45a whose inner surface towards the center of the rotating shaft 20 is in contact with the step 44c, and a contact block 45b attached to an outer surface of the movable block 45a towards the outer peripheral surface of the rotating shaft 20, the contact block 45b being attached adjustably in diametrical position.

For example, a shim (not shown) may be interposed between the contact block 45b and the outer peripheral surface of the movable block 45a and fastened by bolts 45c. The thickness of the shim (number of shims) may be varied to adjust the diametrical position of the contact block 45b.

The movable pin 46 is inserted in the inner peripheral side hole section 44a so as to be movable diametrically slidable by a bearing.

The movable pin 46 has its base end held in contact with the cam portion 41b (a planar or a circular arc surface 41c, 41d thereof) of the cam shaft 41 and its tip end coupled to the movable block 45a via a pressure elastic element, e.g. pressure disc spring 49.

In the state that a circular arc surface 41d of the cam portion 41b of the cam 41 rotated is contacted with the base end of the movable pin 46 as shown in FIG. 9, the movable pin 46 is moved with the cam shaft 41 towards the outer peripheral surface of the rotating shaft 20 (hereinafter, referred to as "towards the outer peripheral side"). Then, the pressure disc spring 49 is elastically compressed (elastically deformed by compression) and has its elastic force increased. The elastic force of the pressure disc spring 49 becoming greater than the elastic force of the return disc spring 48 applies a force towards the outer peripheral side to the pressure block 45. The pressure block 45 is moved towards the outer peripheral side and the pressure block 45 (the contact block 45b) is driven intensely into contact with the inner diameter portion of the sleeve cylinder 30 (the inner peripheral surface 35a of the other side bearer 35), bringing about the state that the sleeve cylinder 30 is coupled to the rotating shaft 20 so that the sleeve cylinder 30 may not be moved rotationally or axially relative to the rotating shaft 20.

In the state that a planar surface 41c of the cam portion 41b of the cam 41 rotated is contacted with the base end of the movable pin 46 as shown in FIG. 10, the movable pin 46 is not moved with the cam shaft 41 towards the outer peripheral surface side. Then, the pressure disc spring 49 is decompressed and restores its original state by its elastic force. The elastic force of the pressure disc spring 49 is prevented from applying a force towards the outer peripheral side to the pressure block 45. The pressure block 45 (the contact block 45b) is parted from the inner diameter portion of the sleeve cylinder 30 (the inner peripheral surface 35a of the other side bearer 35), bringing about the decoupling state that the sleeve cylinder 30 can be moved rotationally and axially relative to the rotating shaft 20.

When the decoupling state is brought about, the pressure block 45 is moved by the elastic force of the return disc spring 48 towards the inner diameter side and is prevented from protruding from the outer peripheral surface of the rotating shaft 20 and is held not protruding in position.

Thus, when the sleeve cylinder 30 is caused to be fitted on or to be extracted from the rotating shaft 20 over its outer peripheral surface, the pressure block 45 is prevented from interfering with the inner diameter portion of the sleeve cylinder 30, allowing the sleeve cylinder 30 easily to be fitted on and to be extracted from the rotating shaft 20.

In bringing the pressure block 45 intensively into contact with the inner diameter portion of the sleeve cylinder 30 to couple the sleeve cylinder 30 to the rotating shaft 20 in this manner, the use of a pressure disc spring 49 having an elastic force allows a dimensional error of the cam portion 41b of the cam shaft 41 or the coupling member 42 to be absorbed in an elastic deformation of the pressure disc spring 49. Hence, with such a dimensional error if any, it is ensured that the pressure block 45 can intensively be urged into contact with the inner diameter portion of the sleeve cylinder 30 while preventing a part from suffering damage.

While in the forms of implementation of the invention described above, a printing machine has been illustrated having a plate, a blanket and an impression cylinder 2, 3 and 4, it is a matter of course that in a printer with a plate and an impression cylinder 2 and 4 the plate cylinder 2 in assembly can be made up as described.

Also, the other side bearing member 16, 61 may unmovably be mounted on the turning frame member 12, 54 and the frame member 12, 54 may be made axially translatable so that the other end bearing member 16, 61 may be made capable of being fitted on and pulled out of the other axial end of the rotating shaft 20 and in the state that it is pulled out, the turning frame member 12, 54 may be turned to the second position mentioned above.

What is claimed is:

1. A printing cylinder assembly for a printing machine, wherein the assembly includes a rotating shaft, a sleeve cylinder removably mounted to fit on the rotating shaft so that it can be fitted on, and be extracted from, the rotating shaft, and a coupling mechanism for coupling and decoupling the sleeve cylinder to and from the rotating shaft, said coupling mechanism comprising a cam shaft and a coupling member with which the rotating shaft is provided, and coming into a coupling state that the coupling member moved diametrically of the rotating shaft is urged into fastening frictional contact with an inner diameter portion of the sleeve cylinder, thereby coupling the sleeve cylinder and the rotating shaft together, and a decoupling state that said coupling member is parted from the inner diameter portion of the sleeve cylinder, thereby decoupling the sleeve cylinder from the rotating shaft, by rotation of the cam shaft, wherein said cam shaft has a cam portion formed circumferentially with a planar and a circular arc surface, said coupling member comprises a movable pin held opposite to the cam portion, a pressure block held opposite to the inner diameter portion of said sleeve cylinder and a pressure elastic element interposed between said movable pin and said pressure block, whereby the movable pin when contacted with the cam portion's circular arc surface by a rotation of the cam shaft is moved to compress the pressure elastic element and to provide an increased elastic force, the increased elastic force driving the pressure block into such contact with the inner diameter portion of the sleeve cylinder and thereby establishing said coupling state, and the movable pin when contacted with the cam portion's planar surface by a rotation of the cam shaft decompresses the elastic element to restore its elastic force, the restored elastic force bringing the pressure block away from the inner diameter portion of the sleeve cylinder and thereby establishing said decoupling state.

2. The printing cylinder assembly for a printing machine as set forth in claim 1, wherein said pressure block is movable diametrically of the rotating shaft and is provided with a return elastic element for biasing the pressure block with a biasing elastic force towards a center of the rotating shaft, whereby the movable pin when contacted with the cam portion's circular arc surface is moved to compress the pressure elastic element and to provide an increased elastic force greater than the biasing elastic force sufficient to drive the pressure block into contact with the inner diameter portion of the sleeve cylinder, thereby establishing said coupling state, and the movable pin when contacted with the cam portion's planar surface allows the pressure elastic element to be decompressed to restore its original elastic force and the pressure block to be moved by the elastic force of the return elastic element towards the center of the rotating shaft, thereby establishing said decoupling state.

3. The printing cylinder assembly for a printing machine as set forth in claim 1, wherein said sleeve cylinder comprises a cylinder body made of an aluminum alloy, and a first and a second bearer made of steel and which are attached to one and the other axial ends of the cylinder body, respectively, and said coupling mechanism comprises a first and a second coupling member which contact with inner peripheral surfaces of the first and second bearers, respectively.

4. The printing cylinder assembly for a printing machine as set forth in claim 1, wherein said rotating shaft is axially supported at one axial end thereof in a cantilever structure so that it may not develop an axial deflection or thrust load, said cam shaft has a protrusion projecting from the other end of the rotating shaft, the protrusion having an operating finger knob, said sleeve cylinder is formed axially and inner-peripherally with a plurality of annular disk shaped ribs and made by casting of an aluminum alloy, the plural ribs forming said inner diameter portion fitting on the rotating shaft, whereby the sleeve cylinder so formed can be fitted on, and be extracted from, the rotating shaft, from said other axial end thereof.

5. The printing cylinder assembly for a printing machine as set forth in claim 1, wherein said coupling mechanism includes three such coupling members positioned at an interval of an angle of 120 degrees circumferentially of said rotating shaft, said three coupling members being adapted to contact with the inner diameter portion of said sleeve cylinder at three circumferentially equidistant positions, respectively.

6. The printing cylinder assembly for a printing machine as set forth in claim 1, wherein said sleeve cylinder is composed of an aluminum alloy, comprising a cylinder and a plurality of annular disk shaped ribs formed on and axially of an inner peripheral surface of the cylinder, said ribs forming an inner diameter portion for fitting on said rotating shaft, said cylinder having on an inner peripheral surface thereof a first convex area for groove machining and a dynamically balancing, second convex area positioned diametrically opposite to the first convex area, said cylinder being machined at a region of said first convex area to form a groove therein for insertion of a grip leading and a grip trailing end of an insertable printing plate, the sleeve cylinder thereby constituting a plate cylinder.

7. The printing cylinder assembly for a printing machine as set forth in claim 2, wherein said sleeve cylinder comprises a cylinder body made of an aluminum alloy, and a first and a second bearer made of steel and which are attached to one and the other axial ends of the cylinder body, respectively, and said coupling mechanism comprises a first and a second coupling member which contact with inner peripheral surfaces of the first and second bearers, respectively.

8. The printing cylinder assembly for a printing machine as set forth in claim 2, wherein said rotating shaft is axially supported at one axial end thereof in a cantilever structure so that it may not develop an axial deflection or thrust load, said cam shaft has a protrusion projecting from the other end of the rotating shaft, the protrusion having an operating finger knob, said sleeve cylinder is formed axially and inner-peripherally with a plurality of annular disk shaped ribs and made by casting of an aluminum alloy, the plural ribs forming said inner diameter portion fitting on the axis of rotation, whereby the sleeve cylinder so formed can be fitted on, and be extracted from, the rotating shaft, from said other axial end thereof.

9. The printing cylinder assembly for a printing machine as set forth in claim 2, wherein said coupling mechanism includes three such coupling members positioned at an interval of an angle of 120 degrees circumferentially of said rotating shaft, said three coupling members being adapted to contact with the inner diameter portion of said sleeve cylinder at three circumferentially equidistant positions, respectively.

10. The printing cylinder assembly for a printing machine as set forth in claim 3, wherein said coupling mechanism includes three such coupling members positioned at an interval of an angle of 120 degrees circumferentially of said rotating shaft, said three coupling members being adapted to contact with the inner diameter portion of said sleeve cylinder at three circumferentially equidistant positions, respectively.

11. The printing cylinder assembly for a printing machine as set forth in claim 4, wherein said coupling mechanism includes three such coupling members positioned at an interval of an angle of 120 degrees circumferentially of said rotating shaft, said three coupling members being adapted to contact with the inner diameter portion of said sleeve cylinder at three circumferentially equidistant positions, respectively.

12. The printing cylinder assembly for a printing machine as set forth in claim 2, wherein said sleeve cylinder is composed of an aluminum alloy, comprising a cylinder and a plurality of annular disk shaped ribs formed on and axially of an inner peripheral surface of the cylinder, said ribs forming an inner diameter portion for fitting on said rotating shaft, said cylinder having on an inner peripheral surface thereof a first convex area for groove machining and a dynamically balancing, second convex area positioned diametrically opposite to the first convex area, said cylinder being machined at a region of said first convex area to form a groove therein for insertion of a grip leading and a grip trailing end of an insertable printing plate, the sleeve cylinder thereby constituting a plate cylinder.

13. The printing cylinder assembly for a printing machine as set forth in claim 3, wherein said sleeve cylinder is composed of an aluminum alloy, comprising a cylinder and a plurality of annular disk shaped ribs formed on and axially of an inner peripheral surface of the cylinder, said ribs forming an inner diameter portion for fitting on said rotating shaft, said cylinder having on an inner peripheral surface thereof a first convex area for groove machining and a dynamically balancing, second convex area positioned diametrically opposite to the first convex area, said cylinder being machined at a region of said first convex area to form a groove therein for insertion of a grip leading and a grip trailing end of an insertable printing plate, the sleeve cylinder thereby constituting a plate cylinder.

14. The printing cylinder assembly for a printing machine as set forth in claim 4, wherein said sleeve cylinder is composed of an aluminum alloy, comprising a cylinder and a plurality of annular disk shaped ribs formed on and axially of an inner peripheral surface of the cylinder, said ribs forming an inner diameter portion for fitting on said rotating shaft, said cylinder having on an inner peripheral surface thereof a first convex area for groove machining and a dynamically balancing, second convex area positioned diametrically opposite to the first convex area, said cylinder being machined at a region of said first convex area to form a groove therein for insertion of a grip leading and a grip trailing end of an insertable printing plate, the sleeve cylinder thereby constituting a plate cylinder.

15. The printing cylinder assembly for a printing machine as set forth in claim 5, wherein said sleeve cylinder is composed of an aluminum alloy, comprising a cylinder and a plurality of annular disk shaped ribs formed on and axially of an inner peripheral surface of the cylinder, said ribs forming an inner diameter portion for fitting on said rotating shaft, said cylinder having on an inner peripheral surface thereof a first convex area for groove machining and a dynamically balancing, second convex area positioned diametrically opposite to the first convex area, said cylinder being machined at a region of said first convex area to form a groove therein for insertion of a grip leading and a grip trailing end of an insertable printing plate, the sleeve cylinder thereby constituting a plate cylinder.

\* \* \* \* \*